United States Patent [19]

Harayama et al.

[11] Patent Number: 5,295,696
[45] Date of Patent: Mar. 22, 1994

[54] COMBINED OIL RING

[75] Inventors: Akira Harayama; Kazuyoshi Aruga, both of Okaya, Japan

[73] Assignee: Teikoku Piston Ring Co., Ltd., Tokyo, Japan

[21] Appl. No.: 34,663

[22] Filed: Mar. 22, 1993

Related U.S. Application Data

[63] Continuation of Ser. No. 854,847, Mar. 20, 1992, abandoned.

[30] Foreign Application Priority Data

Apr. 4, 1991 [JP] Japan .................. 3-030318[U]

[51] Int. Cl.$^5$ .............................................. F16J 9/06
[52] U.S. Cl. .................................. 277/138; 277/139; 277/235 A
[58] Field of Search .............. 277/138, 139, 143, 163, 277/223, 234, 235 A, DIG. 6

[56] References Cited

U.S. PATENT DOCUMENTS

| | | | |
|---|---|---|---|
| 2,905,512 | 9/1959 | Anderson | 277/224 |
| 2,912,292 | 11/1959 | Lawitschka | 277/208 |
| 3,435,502 | 4/1969 | Thompson et al. | 277/235 A |
| 4,040,637 | 8/1977 | McCormick | 277/224 |
| 4,085,490 | 4/1978 | McCormick et al. | 277/138 X |
| 4,185,843 | 1/1980 | Beyer et al. | 277/224 |
| 4,522,412 | 6/1985 | Kubo | 277/163 X |
| 4,579,355 | 4/1986 | Kooroki | 277/224 X |

FOREIGN PATENT DOCUMENTS

| | | | |
|---|---|---|---|
| 0059470 | 1/1942 | Denmark | 277/224 |
| 2406420 | 2/1973 | Fed. Rep. of Germany | 277/235 A |
| 0096344 | 7/1980 | Japan | 277/138 |
| 0045172 | 3/1983 | Japan | 277/224 |
| 1239384 | 6/1986 | U.S.S.R. | 277/24 |
| 1444547 | 12/1988 | U.S.S.R. | 277/24 |
| 0246786 | 8/1926 | United Kingdom | 277/24 |
| 0726954 | 3/1955 | United Kingdom | 277/201 |

OTHER PUBLICATIONS

Patent Abstracts of Japan, vol. 9, No. 272, JP-A-60 116 844.
MTZ, vol. 30, No. 3, 1969, G. Duck, pp. 100-106.
Machine Design, vol. 59, No. 3, Jun. 11, 1987, Cleveland, pp. 58-59.

*Primary Examiner*—William A. Cuchlinski, Jr.
*Assistant Examiner*—Scott W. Cummings
*Attorney, Agent, or Firm*—Armstrong, Westerman, Hattori, McLeland & Naughton

[57] ABSTRACT

A combined oil ring is comprised of a steel oil ring having a generally I-shaped section consisting of upper and lower rails and a web connecting the both rails and a coil expander for forcing the oil ring outwardly. Each of the outer circumferential sliding surfaces of the circumferential outer projecting portions in the upper and lower rails forms a nitrided surface with a hardness of Hv 900 or more, at least one of the upper and lower surfaces in the circumferential outer projecting portion forms a surface with a hardness of lower than Hv 700, and a width of the outer circumferential sliding surface is smaller than 0.25 mm. The other surface of the upper and lower surfaces forms a nitrided surface with a hardness of Hv 900 or more or a surface with a hardness of lower than Hv 700.

10 Claims, 5 Drawing Sheets

COMBINED OIL RING

This application is a continuation of application Ser. No. 07/854,847 filed Mar. 20, 1992, now abandoned.

BACKGROUND OF THE INVENTION

1. Field of the Invention

This invention relates to a combined oil ring of steel used in an internal combustion engine.

2. Description of the Related Art

In general, a two-piece type combined oil ring of cast iron has been normally used in an internal combustion engine, in particular, a diesel engine. In recent years, in place of a cast iron oil ring, a combined steel oil ring has been developed and this has been used in a certain type of engine.

This combined steel oil ring is already described in, for example, U.S. Pat. No. 4,522,412 (Continuation of Ser. No. 436,811) and the gazette of Jap. Pat. Laid-Open No. 61-45172 (Appl. No. 60-167417). The combined oil ring is comprised of a steel oil ring having a generally I-shaped section consisting of upper and lower rigid rails and a thin web connecting the both rails and provided with a plurality of oil holes, and a coil expander forcing the steel oil ring outwardly. The circumferential outer projecting portions of the upper and lower rails of the oil ring have respectively a trapezoidal sectional shape defined by an outer circumferential sliding surface and upper and lower surfaces connecting with the sliding surface. As compared with a cast iron oil ring, a combined steel oil ring has a high strength and a superior conformable characteristic to a cylinder wall, so that it is expected that its practical use will be increased in the future.

In case of the aforesaid combined oil ring, a reduction of width of the outer circumferential sliding surface in the oil ring increases a contact surface pressure with the cylinder and then reduces a thickness of lubricant oil film. In case of the same surface unit pressure as the pressure of conventional ring, its tangential load can be reduced. Since this reduces frictional loss, a reduction of width of the sliding surface is increasingly required more and more in the engines of recent years.

However, as a width of the sliding surface is decreased, a greater anti-wearing characteristic of the outer circumferential sliding surface is required. In general, a sliding surface having a superior anti-wearing characteristic has a lack of toughness. Due to this fact, when a chrome plating or a nitriding treatment or the like was applied to a combined steel oil ring to improve an anti-wearing characteristic, a width of the outer circumferential sliding surface could not be smaller than 0.25 mm. For example, when a thick nitriding treatment which is well known for its superior anti-wearing characteristic is applied to a small circumferential outer projecting portion with a width of the outer circumferential sliding surface smaller than 0.25 mm, the nitriding is advanced from the entire surface of the projecting portion into its inner portion and most of the surface in the section of the projecting portion is nitrided, so that no tough steel bare material is left. Such an oil ring as described above may exhibit chipping off at this part during its machining work or its assemblying work. In this case, a width of the outer circumferential sliding surface of the steel oil ring to which is applied an anti-wearing treatment is normally 0.3 mm to 0.4 mm.

SUMMARY OF THE INVENTION

It is an object of the present invention to provide a combined oil ring in which an outer circumferential sliding surface is small in width and has a superior anti-wearing characteristic and at the same time a circumferential outer projecting portion with the outer circumferential sliding surface has a high toughness.

The combined oil ring of the present invention is comprised of a steel oil ring having a generally I-shaped section consisting of upper and lower rails and a web connecting the upper and lower rails and a coil expander for forcing the oil ring outwardly, wherein each of the outer circumferential sliding surfaces of the circumferential outer projecting portions in the upper and lower rails forms a nitrided surface with a hardness of Hv 900 or more, at least one of upper and lower surfaces connecting with the outer circumferential sliding surface in the circumferential outer projecting portion forms a surface with a hardness of lower than Hv 700 and a width of the outer circumferential sliding surface is smaller than 0.25 mm.

Since a width of the outer circumferential sliding surface is smaller than 0.25 mm, a contact surface pressure with the cylinder is increased more than that of the prior art, resulting in that a thickness of a lubricant oil film can be reduced and a tangential load can be reduced in case of the same surface pressure and so a frictional loss can be reduced. Since the outer circumferential sliding surface forms a nitrided surface with a hardness of Hv 900 or more, it has a superior anti-wearing characteristic, and further since at least one of the upper and lower surfaces connecting with the outer circumferential sliding surfaces has a hardness of lower than Hv 700, the circumferential outer projecting portion has a high toughness.

BRIEF DESCRIPTION OF THE DRAWINGS

The above and other objects and other features of the present invention will become more apparent in reference to the following detailed description and the accompanying drawings.

DESCRIPTION OF THE PREFERRED EMBODIMENTS

Figure 1:
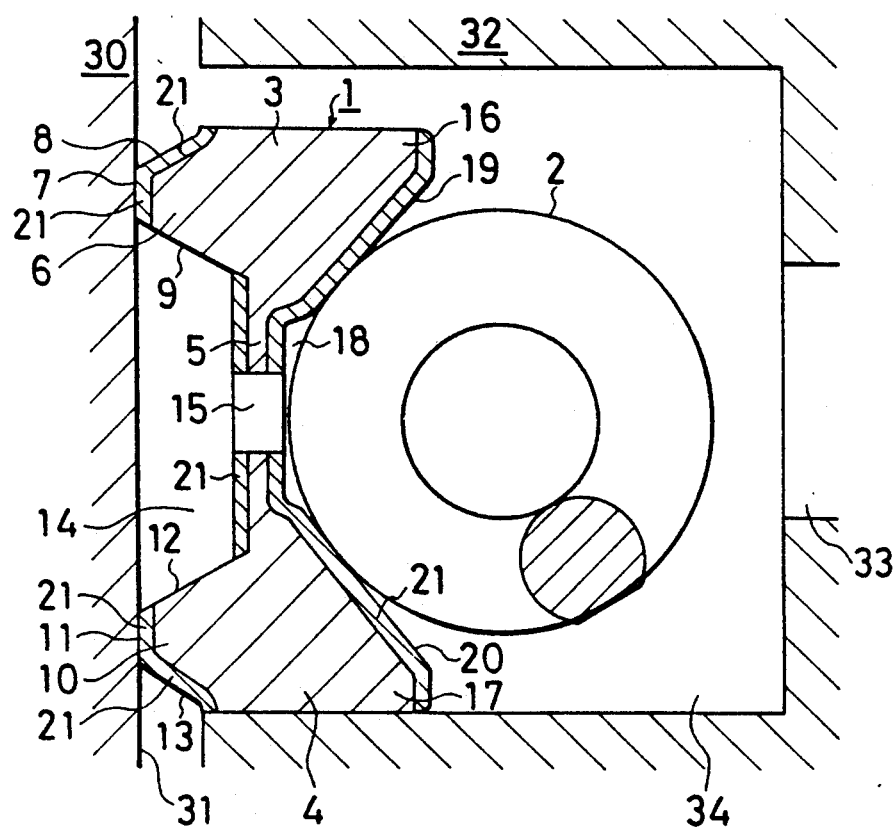
FIG. 1 is a longitudinal sectional view showing a combined oil ring of the present invention which is installed in a ring groove of a piston inserted into a cylinder.

FIG. 1 shows a combined oil ring fitted in an oil ring groove 34 of a piston 32. As shown in FIG. 1, the combined oil ring is comprised of a steel oil ring 1 and a coil expander 2. The oil ring 1 is an annular ring having a substantially I-shaped section consisting of upper and lower rails 3 and 4 and a thin straight web 5 connecting these rails. A circumferential outer projecting portion 6 of the upper rail 3 has a trapezoidal section defined by an outer circumferential sliding surface 7 contacting with an inner wall 31 of a cylinder 30 and inclined upper and lower surfaces 8 and 9 connecting with the sliding surface 7, and a width of the projecting portion 6 is narrowed toward the outer circumferential sliding surface 7. The lower rail 4 is also formed in the same manner as the upper rail 3, wherein reference numeral 10 denotes a circumferential outer projecting portion, reference numeral 11 denotes an outer circumferential sliding surface, and reference numerals 12 and 13 denotes upper and lower surfaces.

An outer circumferential groove 14 defined by the circumferential outer projecting portions 6, 10 of the upper and lower rails 3, 4 and the web 5 is a groove for receiving oil scraped from the inner wall 31 of the cylinder 30 by the outer circumferential sliding surfaces 7 and 11. The scraped oil passes from the outer circumferential groove 14 through a plurality of oil holes 15 formed equally spaced apart in a circumferential direction at the web 5, moves toward an inner circumferential side of the oil ring 1, passes through oil passages 33 formed in the piston 32 and then is dropped into an oil pan (not shown).

Circumferential inner projecting portions 16 and 17 in the upper and lower rails 3 and 4 are also formed as trapezoidal shape in section, and an inner circumferential groove 18 is defined by the circumferential inner projecting portions 16 and 17 and the web 5. A coil expander 2 is disposed in the groove 18 in contacted with the inner inclined surfaces 19, 20 in the circumferential inner projecting portions 16, 17 and forces the oil ring 1 in a radial outward direction. The coil expander 2 is made such that a wire material is wound in a coil form, and both ends thereof are abutted to each other to form an annular shape with a guide rod inserted. In the FIGURE, the wire material having a section presenting a part of a circle is illustrated and a sectional shape of the wire material may be a rectangular shape, a square shape or other shapes than a circular one.

The surface of the oil ring < is formed with an antiwearing layer as indicated below. That is, the circumferential outer projecting portion 6 of the upper rail 3 has a nitride layer 21 with a hardness of Hv 900 or more at an outer circumferential sliding surface 7 and the upper surface 8 connecting with the outer circumferential sliding surface 7. The circumferential outer projecting portion 10 of thelower rail 4 has a nitrided layer 21 with a hardness of Hv 900 or more at the outer circumferential sliding surface 11 and the lower surface 13 connecting with the outer circumferential sliding surface 11. The lower surface 9 of the circumferential outer projecting portion 6 of the upper rail 3 and the upper surface 12 of the circumferential outer projecting portion 10 of the lower rail 4 are made such that their base material surfaces are exposed or their surfaces are formed with phosphate coating treatment layers or ferrox coating treatment layers or the like to show a hardness of lower than Hv 700. As regards the other surfaces, upper and lower surfaces of the oil ring 1 are made such that their base material surfaces are exposed and the outer circumferential surface of the web 5 and the inner circumferential surface of the oil ring 1 are formed with the nitrided layers 21 with a hardness of Hv 900 or more. A width of each of the outer circumferential sliding surfaces 7 and 11 is 0.18 mm and a thickness of the nitrided layer 21 is 70μm. A nitriding process is carried out by a gas nitriding, a salt bath nitriding or an ion nitriding or the like and any type of nitriding can be applied.

A method of manufacturing the oil ring will be described as follows.

Figure 3:
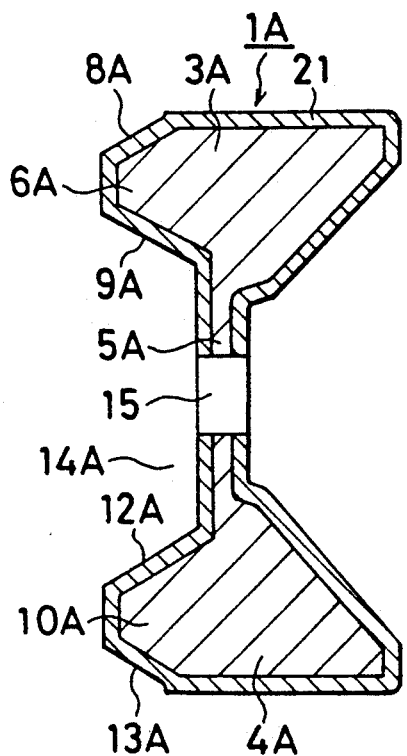
FIG. 3 is a longitudinal sectional view showing an oil ring of which the entire surface is nitrided.

A steel wire material made of martensitic stainless steel and having an irregular sectional shape (refer to FIG. 3) forming a substantially I-shaped section consisting of the upper and lower rails being connected by a straight thin web is formed with a plurality of oil holes, thereafter the material is formed into a coil. The oil holes are equally spaced apart in a longitudinal direction at the web of the steel wire material. Then, the coiling wire material is cut and its ends are machined to get an oil ring. A gas nitriding treatment is applied to the oil ring and as shown in FIG. 3, a nitrided layer 21 is formed on an entire surface of the annular oil ring 1A of having a substantially I-shaped section in which the upper and lower rails 3A and 4A are connected by a straight thin web 5A.

Figure 2:
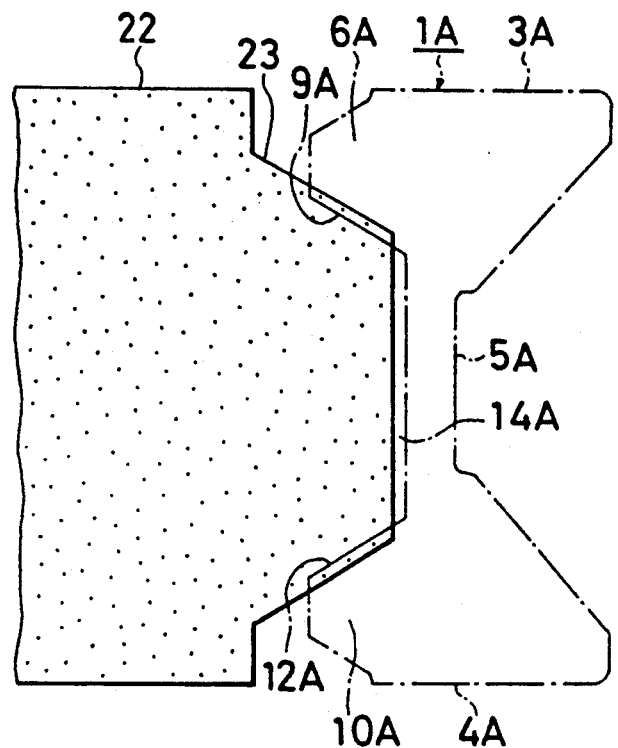
FIG. 2 illustrates a grinding operation for a nitrided layer in an oil ring.

Then, a predetermined surface of the oil ring 1A is ground to remove the nitrided layer at a predetermined portion. That is, as shown in FIG. 2, a grinding wheel 22 is provided with a projecting portion 23 over an entire circumference of an outer circumferential surface. The projecting portion 23 has a trapezoidal section in which its width is narrowed toward an outer circumferential side. An outer circumferential groove 14A is defined by the circumferential outer projecting portions 6A, 10A of the upper and lower rails 3A, 4A and a web 5A. The outer circumferential groove 14A enters the projecting portion 23. A lower surface 9A of the circumferential outer projecting portion 6A of the upper rail 3A and the upper surface 12A of the circumferential outer projecting portion 10A of the lower rail 4A in the oil ring 1A are ground by the upper and lower surfaces of the projecting portion 23 so as to remove the nitrided layer.

After this operation, in the same manner as usual piston ring machining operations, a grinding work at the upper and lower surfaces of the oil ring 1A, a phosphate coating treatment or ferrox coating treatment at the upper and lower surfaces and the other parts than the outer circumferential sliding surface and a lapping work at the outer circumferential sliding surface are carried out. In this way, the oil ring having a quite small sliding surface width of 0.18 mm and having a thick nitrided layer of a thickness of 70 pm at the outer circumferential sliding surface can be attained.

Figure 4:
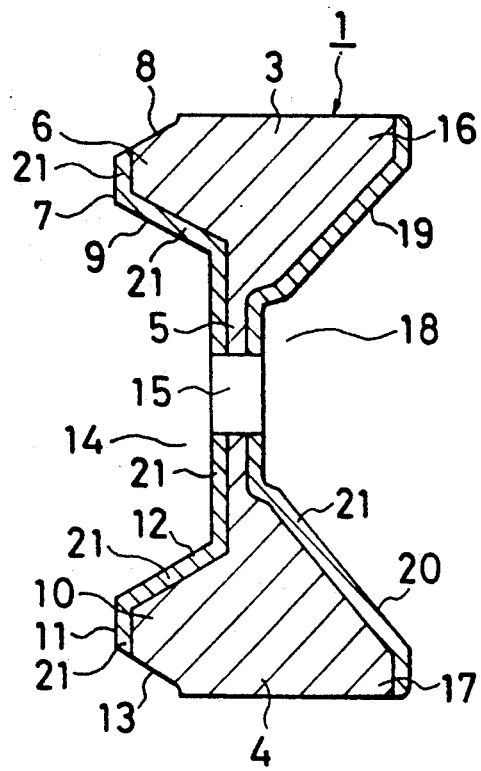
FIG. 4 is a longitudinal sectional view showing another example of the oil ring of the present invention.

FIG. 4 illustrates another oil ring, wherein only the parts having the nitrided layer removed are different from those of FIG. 1 and the others are the same as those of FIG. 1. That is, in FIG. 4, the nitrided layer of the upper surface 8 of the circumferential outer projecting portion 6 of the upper rail 3 is removed, the nitrided layer 21 of the lower surface 9 remains, the nitrided layer of the lower surface 13 of the circumferential outer projecting portion 10 of the lower rail 4 is removed and the nitrided layer 21 of the upper surface 12 remains and the others are the same as those of FIG. 1.

Figure 5:
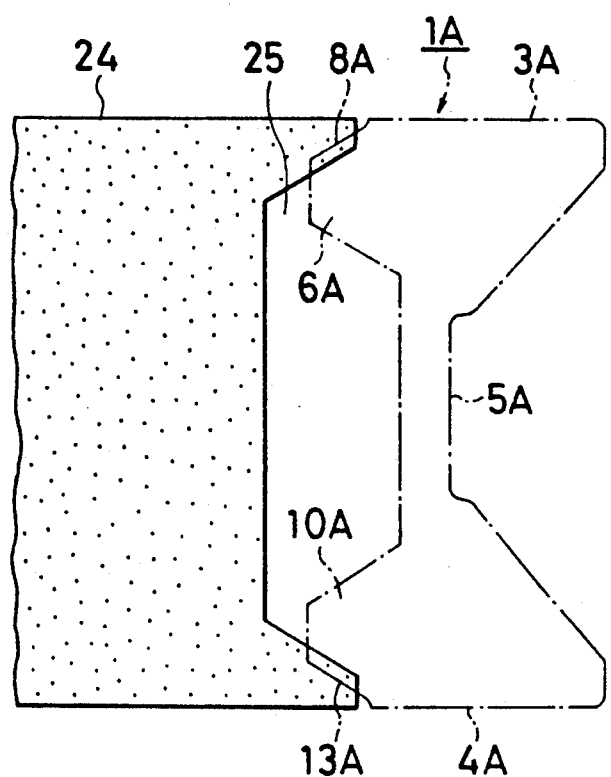
FIG. 5 illustrates a grinding operation for a nitrided layer in an oil ring.

A grinding wheel for use in removing the nitrided layer in this example is shown in FIG. 5. A grinding wheel 24 is provided with a circumferential groove 25 at its outer circumferential surface, and the circumferential groove 25 has a trapezoidal shape in section in which it is widened toward its outer circumference.

Circumferential outer projecting portions 6A, 10A of the upper and lower rails 3A, 4A in the oil ring 1A enter the circumferential groove 25. The upper surface 8A of the circumferential outer projecting portion 6A of the upper rail 3A and the lower surface 13A of the circumferential outer projecting portion 10A of the lower rail 4A in the oil ring 1A are ground by the upper and lower surfaces of the circumferential groove 25 so as to remove the nitrided layer. Other manufacturing methods are the same as those described in reference to FIG. 1.

Figure 6:
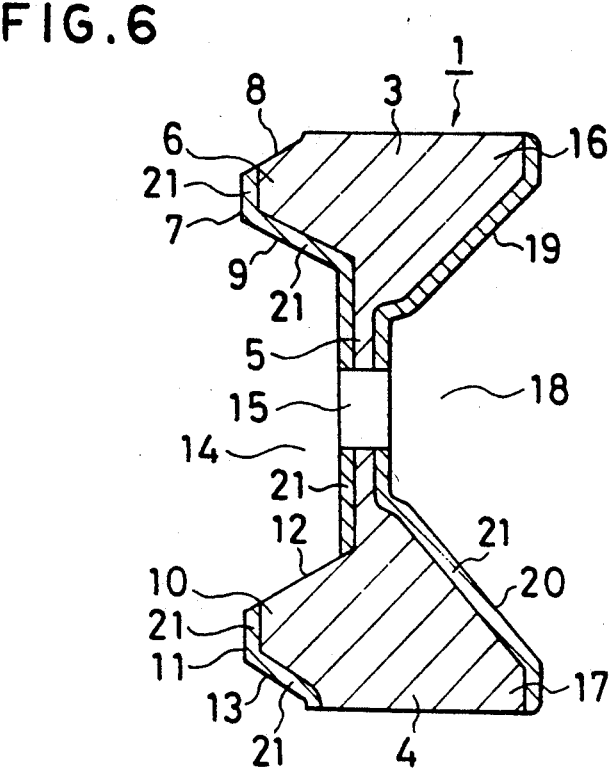
FIG. 6 is a longitudinal sectional view showing another example of the oil ring of the present invention.

FIG. 6 illustrates another oil ring, wherein only the removing part of the nitrided layer is different from that of FIG. 1 and the others are the same as those of FIG. 1. That is, in FIG. 6, the nitrided layer of the upper surface 8 of the circumferential outer projecting portion 6 of the upper rail 3 is removed, the nitrided layer 21 of the lower surface 9 is left, the nitrided layer of the upper surface 12 of the circumferential outer projecting portion 10 of the lower rail 4 is removed and the nitrided layer 21 of the lower surface 13 is left and the others are the same as those shown in FIG. 1. When the oil ring of this example is installed in the piston, it is installed in such a way as the ground surface at the upper and lower surfaces of the circumferential outer projecting portion is faced downward.

Figure 7:
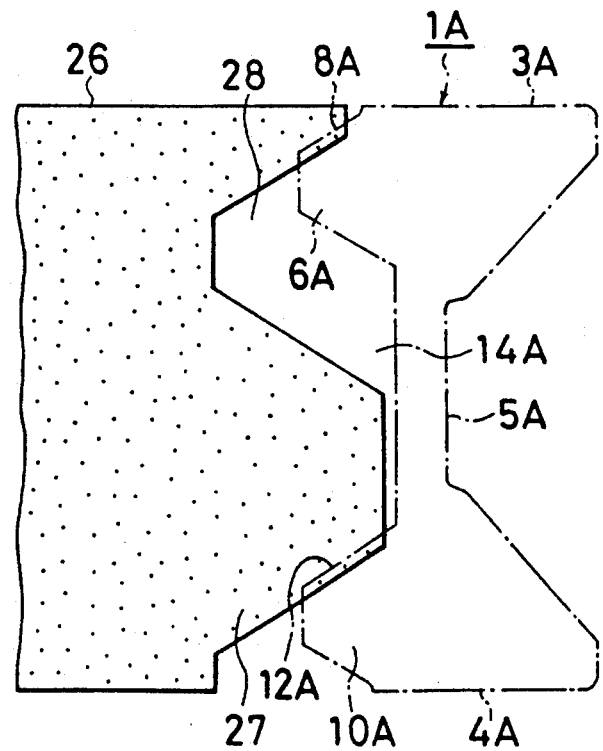
FIG. 7 illustrates a grinding operation for a nitrided layer in an oil ring.

A grinding wheel for use in removing the nitrided layer in this example is shown in FIG. 7. A grinding wheel 26 is provided with a projecting portion 27 over its entire outer circumferential surface. The projecting portion 27 has a trapezoidal shape in section of which width is narrowed toward an outer circumference. The grinding wheel 26 is provided with a circumferential groove 28 adjacent to the projecting portion 27. The circumferential groove 28 forms a trapezoidal shape in section in which its width is widened toward an outer circumferential side. The outer circumferential groove 14A of the oil ring 1A enters the projecting portion 27, the circumferential outer projecting portion 6A of the upper rail 3A of the oil ring 1A enters the circumferential groove 28. The nitrided layer of the upper surface 8A of the circumferential outer projecting portion 6A of the upper rail 3A is removed by the upper surface of the circumferential groove 28 and the nitrided layer of the upper surface 12A of the circumferential outer projecting portion 10A of the lower rail 4A is removed by the lower surface of the projecting portion 27. Other manufacturing methods are the same as those described in reference to FIG. 1.

Figure 8:
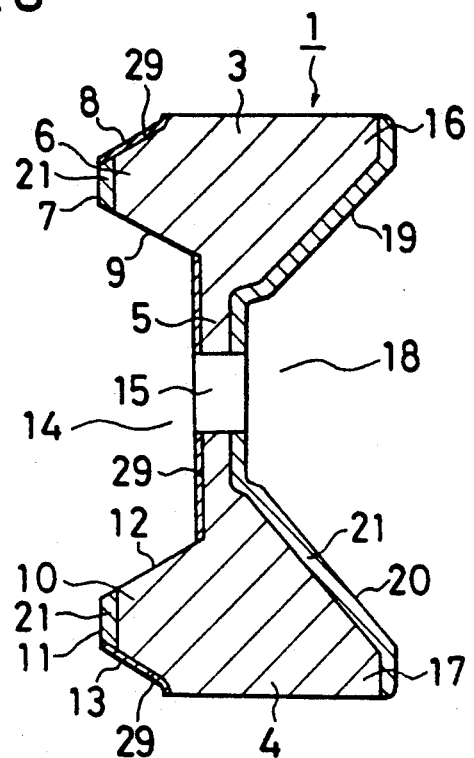
FIG. 8 is a longitudinal sectional view showing another example of the oil ring of the present invention.

FIG. 8 shows another oil ring, wherein only the surface treatment is different from that of FIG. 1 and the others are the same as those of FIG. 1. That is, in FIG. 8, the outer circumferential sliding surfaces 7, 11 of the circumferential outer projecting portions 6, 10 in the upper and lower rails 3, 4 are formed with the nitrided layer 21 with a hardness of Hv 900 or more. The upper surface 8 of the circumferential outer projecting portion 6 of the upper rail 3 and the lower surface 13 of the circumferential outer projecting portion 10 of the lower rail 4 are formed with a nitriding preventive plating 29 with a hardness of lower than Hv 700. At the lower surface 9 of the circumferential outer projecting portion 6 of the upper rail 3 and the upper surface 12 of the circumferential outer projecting portion 10 of the lower rail 4, their base material surfaces are exposed or their surfaces are formed with phosphate coating treatment layers or ferrox coating treatment layers or the like to show a hardness of lower than Hv 700. As regards the other surfaces, the outer circumferential surface of the web 5 is formed with a nitriding preventive plating 29 with a hardness of lower than Hv 700, base material surfaces are exposed at the upper and lower surfaces of the oil ring 1 and the inner circumferential surface of the oil ring 1 is formed with the nitrided layer 21 with a hardness of Hv 900 or more. A width of the outer circumferential sliding surfaces 7, 11 is 0.18 mm, a thickness of the nitrided layer 21 is 70μm and a thickness of the nitriding preventive plating is 20μm. As the nitriding preventive plating, a metallic plating selected from a group of copper, tin, nickel, chrome and alloys of these metals or at least double layered plating of the metals are available. A nitriding process is carried out by a gas nitriding, a salt bath nitriding or an ion nitriding or the like and any type of nitriding can be applied.

A manufacturing method of this oil ring will be described as follows.

After making the oil ring before surface treatment in the same manner as that described above, a copper plating of a thickness of 20 μm for preventing nitriding is applied to the outer circumferential surface. After grinding the outer circumferential sliding surface of the oil ring to expose the steel raw material, a gas nitriding treatment is carried out. Then, in the same manner as that described above, a grinding of the surface in the circumferential outer projecting portion is carried out by the grinding wheel shown in FIG. 2 and the nitriding preventive plating at a predetermined portion is removed. After this operation, in the same manner as usual piston ring machining operations, a grinding work at the upper and lower surfaces of the oil ring, a phosphate coating treatment or ferrox coating treatment at the upper and lower surfaces and the other parts than the outer circumferential sliding surface and a lapping work at the outer circumferential sliding surface are carried out.

Figure 9:
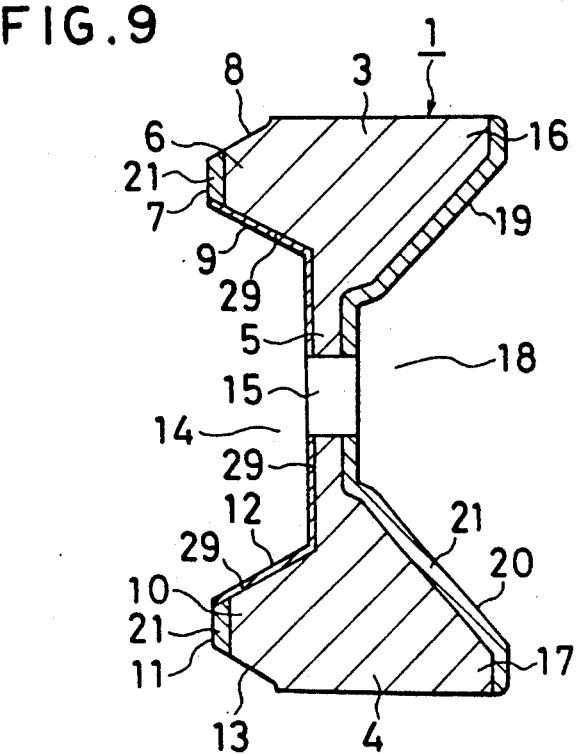
FIG. 9 is a longitudinal sectional view showing another example of the oil ring of the present invention.

FIG. 9 shows another oil ring, wherein only the parts having the nitriding preventive plating removed are different from those of FIG. 8 and the others are the same as those of FIG. 8. That is, in FIG. 9, the nitriding preventive plating at the upper surface 8 of the circumferential outer projecting portion 6 of the upper rail 3 is removed, the nitriding preventive plating 29 at the lower surface 9 remains, the nitriding preventive plating at the lower surface 13 of the circumferential outer projecting portion 10 of the lower rail 4 is removed and the nitriding preventive plating 29 at the upper surface 12 remains and the others are the same as those shown in FIG. 8.

A grinding wheel for use in removing the nitriding preventive plating in this example is shown in FIG. 5 and the nitriding preventive plating can be removed in the same manner as that of removing the aforesaid nitrided layer. Other manufacturing methods are the same as those described in reference to FIG. 8.

In addition as an example in which only the part having the nitriding preventive plating is different from that shown in FIG. 8, the nitriding preventive plating at the upper surface 8 of the circumferential outer projecting portion 6 of the upper rail 3 is removed, the nitriding preventive plating at the lower surface 9 is left, the nitriding preventive plating at the upper surface 12 of the circumferential outer projecting portion 10 of the lower rail 4 is removed, the nitriding preventive plating at the lower surface 13 is left and the others are the same as those shown in FIG. 8. When the oil ring of this example is installed in the piston, it is installed in such a way as the ground surface in the upper and lower surfaces of the circumferential outer projecting portion is faced downward. As a grinding wheel for use in removing the nitriding preventive plating in this example, the grinding wheel shown in FIG. 7 may be used. Other manufacturing methods are the same as those described in reference to FIG. 8.

In all the aforesaid examples, the nitrided layer or the nitriding preventive plating at only one surface in the upper and lower surfaces 8, 9, 12 and 13 of the circumferential outer projecting portions 6 and 10 is removed and the nitrided layer or the nitriding preventive plating of the other surface is, left. However, both surfaces having the nitrided layer or the nitriding preventive plating may be removed. In this case, as the grinding wheels, both grinding wheels shown in FIGS. 2 and 5 are used. A grinding wheel shown in FIG. 7 may be used and both surfaces are ground by reversing the oil ring. When the upper and lower surfaces of the circumferential outer projecting portion are ground, the grinding method for performing concurrently the grinding of both surfaces causes a grinding stress to be increased, so that chipping off may easily occur. Accordingly, it is better that the surfaces are ground one by one.

Although the present invention has been described with reference to preferred embodiment, it is apparent that the present invention is not limited to the aforesaid preferred embodiment, but various modifications can be attained without departing from its scope.

What is claimed is:

1. A combined oil ring for a piston engine comprising a steel oil ring having a generally I-shaped section consisting of upper and lower rails and a web connecting the upper and lower rails and a coil expander for forcing the oil ring outwardly, wherein each outer projecting portions in said upper and lower rails is coated with a nitrided layer having a hardness of Hv 900 or more, at least one of an upper and a lower surface connecting with the outer circumferential sliding surface at said circumferential outer projecting portion forms a surface lacking said nitrided layer and having a hardness lower than Hv 700, and an axial width of said outer circumferential sliding surface is smaller than 0.25 mm.

2. A combined oil ring according to claim 1 in which one of the upper and lower surfaces connecting with the outer circumferential sliding surface at said circumferential outer projecting portion forms a surface having a hardness of lower than Hv 700 and the other surface forms a nitrided surface with a hardness of Hv 900 or more.

3. A combined oil ring according to claim 1 in which one of the upper and lower surfaces connecting the outer circumferential sliding surface at said circumferential outer projecting portion forms a surface with a hardness of lower than Hv 700 and the other surface forms a surface with a hardness of lower than Hv 700.

4. A combined oil ring according to claim 1, 2 or 3 in which said circumferential outer projecting portion forms a trapezoidal section defined by an outer circumferential sliding surface and inclined upper and lower surfaces connecting with the outer circumferential sliding surface and its axial width is narrowed toward the outer circumferential sliding surface.

5. A combined oil ring according to claim 1, 2 or 3 in which the surface having a hardness of lower than Hv 700 is a base material surface.

6. A combined oil ring according to claim 1, 2 or 3 in which the surface having a hardness of lower than Hv 700 is a phosphate coating treatment surface.

7. A combined oil ring according to claim 1, 2 or 3 in which the surface having a hardness of lower than Hv 700 is a ferrox coating treatment surface.

8. A combined oil ring according to claim 1, 2 or 3 in which the surface having a hardness of lower than Hv 700 is a nitriding preventive plating surface.

9. A combined oil ring according to claim 1, 2 or 3 in which the surface having a hardness of lower than Hv 700 is a nitriding preventive plating surface, and said nitriding preventive plating is a metallic plating selected from a group of copper, tin, nickel, chrome and alloys of these metals.

10. A combined oil ring according to claim 1, 2 or 3 in which the surface having a hardness of lower than Hv 700 is a nitriding preventive plating surface, and said nitriding preventive plating is at least double layered plating of the metals selected from a group of copper, tin, nickel, chrome and alloys of these metals.

* * * * *